(12) United States Patent
Elbaz (10) Patent No.: US 10,695,659 B2
(45) Date of Patent: Jun. 30, 2020

(54) PUZZLE SET AND METHOD THEREOF

(71) Applicants: Ofir Elbaz, Kibbutz Lohamei HaGeta'ot (IL); Asaf Elbaz, Moshav Ben Ami (IL); Chen Elbaz, Kibbutz Lohamei HaGeta'ot (IL); Yehuda Elbaz, Akko (IL)

(72) Inventor: Yehuda Elbaz, Akko (IL)

(73) Assignees: Ofir Elbaz, Kibbutz Lohamei HaGeta'ot (IL); Asaf Elbaz, Moshav Ben Ami (IL); Chen Elbaz, Kibbutz Lohamei HaGeta'ot (IL); Yehuda Elbaz, Akko (IL)

( * ) Notice: Subject to any disclaimer, the term of this patent is extended or adjusted under 35 U.S.C. 154(b) by 70 days.

(21) Appl. No.: 16/026,971

(22) Filed: Jul. 3, 2018

(65) Prior Publication Data

US 2018/0318702 A1 Nov. 8, 2018

Related U.S. Application Data

(63) Continuation-in-part of application No. PCT/IL2017/050008, filed on Jan. 2, 2017.

(30) Foreign Application Priority Data

Jan. 4, 2016 (IL) .......................................... 243472

(51) Int. Cl.
*A63F 9/08* (2006.01)
*A63F 9/12* (2006.01)
(Continued)

(52) U.S. Cl.
CPC .............. *A63F 9/0803* (2013.01); *A63F 9/08* (2013.01); *A63F 9/1204* (2013.01); *A63F 13/23* (2014.09);
(Continued)

(58) Field of Classification Search
CPC .... A63F 9/0803; A63F 13/23; A63F 2300/12; A63F 9/0826; A63F 2009/0846; A63F 3/00634
See application file for complete search history.

(56) References Cited

U.S. PATENT DOCUMENTS

| 4,416,453 A | 11/1983 | Sasso |
| 4,529,201 A | 7/1985 | Nadel |

(Continued)

FOREIGN PATENT DOCUMENTS

| CN | 2298843 Y | 12/1998 |
| IL | 75706 A | 1/1991 |
| WO | 98/08578 A1 | 3/1998 |

OTHER PUBLICATIONS

International Search Report for PCT/IL2017/050008, dated Apr. 2, 2017.

(Continued)

*Primary Examiner* — William H McCulloch, Jr.
*Assistant Examiner* — Ankit B Doshi
(74) *Attorney, Agent, or Firm* — FisherBroyles, LLP; Robert Kinberg (57) ABSTRACT

A puzzle set comprises a plurality of cubes, each configured with a drawing at one or more of its facets; and an interface configured to cause the cubes to be positioned one adjacent to the other while permitting a change in disposition and rotational state of any of the cubes. The drawings are designed to allow continuation of one another, by which viewable contiguous facets define together a composite symbol, upon positioning the cubes in accordance with a predetermined arrangement. At least one of the facets is rotatable in relation to other facets when the cubes are positioned one adjacent to the other, allowing rotation of its drawing without separating the cubes. In a method for generating a viewable object, a facet is displaced and rotated (Continued)

until the drawing on each of the viewable contiguous facets are in continuation of one another to define together the viewable object.

20 Claims, 11 Drawing Sheets

(51) Int. Cl.
    *G09B 1/16*       (2006.01)
    *G09B 1/00*       (2006.01)
    *G09B 1/02*       (2006.01)
    *A63F 13/23*     (2014.01)

(52) U.S. Cl.
    CPC ................ *G09B 1/00* (2013.01); *G09B 1/02* (2013.01); *G09B 1/16* (2013.01); *A63F 2009/1236* (2013.01); *A63F 2300/1025* (2013.01)

(56) References Cited

U.S. PATENT DOCUMENTS

| | | | |
|---|---|---|---|
| 5,215,305 A | 6/1993 | Hsun | |
| 5,310,183 A | 5/1994 | Glikmann | |
| 5,333,869 A | 8/1994 | Hsun | |
| 5,823,530 A * | 10/1998 | Yang | A63F 9/0865 273/153 S |
| 6,997,458 B1 * | 2/2006 | Yokomi | A63F 9/0415 273/146 |
| 7,887,056 B2 * | 2/2011 | Tenorio | A63F 9/1208 273/156 |
| 7,976,024 B1 * | 7/2011 | Stapleton | A63H 33/065 273/156 |
| 9,409,080 B1 * | 8/2016 | Yang | A63F 9/0826 |
| 2006/0232006 A1 * | 10/2006 | Fang | A63F 9/0803 273/157 R |
| 2008/0230988 A1 * | 9/2008 | Paquette | A63F 9/0838 273/153 R |
| 2014/0077454 A1 * | 3/2014 | Lapstun | A63F 13/005 273/153 S |
| 2019/0143201 A1 * | 5/2019 | Humm | A63F 9/1204 273/153 S |

OTHER PUBLICATIONS

Written Opinion for PCT/IL2017/050008, dated Apr. 2, 2017.
International Preliminary Report on Patentability for PCT/IL2017/050008 (submitted without annexes), dated Dec. 4, 2017.
Extended European Search Report in related European Patent Application No. 17735922.1, dated Aug. 23, 2019, 5 pages.

* cited by examiner

PUZZLE SET AND METHOD THEREOF

This application is a Continuation-in-Part of International Patent Application No. IL2017/050008 filed on Jan. 2, 2017, which claims priority from Israeli Patent Application No. 243472 filed on Jan. 4, 2016.

FIELD OF THE INVENTION

The invention relates to the field of games. More particularly, the invention relates to a puzzle set and a method therefor.

BACKGROUND OF THE INVENTION

Israeli patent number 75706 discloses a puzzle set providing various combinations for completing together various symbols.

However, each activity of placing the elements in IL 75706 requires removal of the entire element from the set.

CN2298843 to ZHAO XIYANG discloses perpendicular directions of a magic cube, for splicing plates to generate different picture arrangement changes.

However, none of the above discloses rotation of the pictures without removal thereof.

Other objects and advantages of the invention will become apparent as the description proceeds.

SUMMARY OF THE INVENTION

A puzzle set comprises a plurality of cubes, each comprising a drawing at one or more facets thereof; and an interface configured to cause said plurality of cubes to be positioned one adjacent to the other and to cause a first facet of each of said plurality of cubes viewed by a player to be coplanar, while permitting a change in disposition and rotational state of the first facet of any of said plurality of cubes, wherein said drawings are designed to allow continuation of one another, by which contiguous facets of said plurality of cubes that are viewed by a player define together a composite symbol or symbols, upon positioning said plurality of cubes in accordance with a predetermined arrangement, and wherein at least one of said facets of each of said plurality of cubes comprises displacement facilitating apparatus to facilitate outward linear displacement and subsequent rotation of a selected one of the first facets in relation to all other first facets of said plurality of cubes when the first facet of each of said plurality of cubes are positioned one adjacent to the other and are coplanar and contiguous one with another, thereby allowing rotation of the drawing of said selected first facet to achieve said predetermined arrangement.

In one aspect, at least one of said facets of each of said plurality of cubes is rotatable in relation to other facets of said each of said plurality of cubes.

In one aspect, said at least one of said facets of said plurality of cubes comprises displacement facilitating apparatus to facilitate linear displacement and subsequent rotation in relation to the other facets of said plurality of cubes, said displacement facilitating apparatus comprises a stationary surface; and a movable surface which is movable in relation to said stationary surface.

In one aspect, the displacement facilitating apparatus is configured to facilitate concurrent linear displacement and rotation in relation to the other facets of said plurality of cubes.

In one aspect, at least one, for example all facets, of said facets of each of said plurality of cubes comprise the displacement facilitating apparatus.

In one aspect, the displacement facilitating apparatus further comprises rotation facilitating apparatus to facilitate rotation in relation to the other facets of said plurality of cubes. The rotation facilitating apparatus may comprise an axle, for moving said movable surface thereabout.

In one aspect, the displacement facilitating apparatus further comprises a positioning element, for positioning said movable surface at a stable position in relation to said stationary surface. Said positioning element may comprise a member selected from a group consisting of a spring and a magnet.

In one aspect, said at least one of said facets further comprises oblique surfaces of said stationary surface and of said movable surface, being complementary one to the other.

In one aspect, said at least one of said facets further comprises an element for preventing removal of said movable surface from said stationary surface.

In one aspect, the interface is a frame configured to cause said plurality of cubes to be positioned one adjacent to the other within the frame, to permit removal of any of said plurality of cubes therefrom, and to permit a change in disposition and rotational state of any of said plurality of cubes, and wherein at least one of said facets of said plurality of cubes is rotatable in relation to other facets of said plurality of cubes when said plurality of cubes are positioned one adjacent to the other, thereby allowing rotation of the drawing thereof without removing said first cube from said frame.

In one aspect, the frame is configured to urge the plurality of cubes in a formation of rows and columns, when placed adjacent one to the other within the frame.

In one aspect, the interface is embodied by magnetic material which is provided with one or more facets of each of said plurality of cubes, for magnetically coupling together adjacent cubes.

In one aspect, the displacement facilitating apparatus comprises a hollow element extending from the selected first facet which is rotatable about a tubular projection of a core member, a coiled spring housed within said hollow element for facilitating the outward linear displacement, and a latch mechanism releasably engageable with an element connected to the selected first facet for preventing the outward linear displacement when the selected first facet is in a retracted position.

In one aspect, the displacement facilitating apparatus further comprises one or more electromechanical devices and an actuator for effecting the displacement. The actuator may be mounted on the interface, the interface comprising circuitry causing said plurality of cubes to be positioned one adjacent to the other and the displacement facilitating apparatus of two or more of said plurality of cubes to be simultaneously and selectively effected.

In one aspect, the interface is a user interface and said plurality of cubes are graphically displayable on a screen of an electronic device, said user interface configured to cause rotation of one or more cubes of said plurality of cubes in response to selective manipulation of said user interface and predetermined instructions stored in a processor on which said user interface is running to define the composite symbol or symbols in accordance with the predetermined arrangement.

A method for generating a viewable object comprises the steps of providing a plurality of cubes, each comprising a drawing at one or more facets thereof, causing said plurality of cubes to be positioned one adjacent to the other while the drawing on each of viewable contiguous facets of said plurality of cubes are non-continuous; causing at least one of said facets of said plurality of cubes to be displaced and rotated in relation to other facets of said plurality of cubes when said plurality of cubes are positioned one adjacent to the other until the drawing on each of said viewable contiguous facets are in continuation of one another to define together said viewable object.

In one aspect, a selected number of said plurality of cubes are selectively and simultaneously rotatable.

In one aspect, a first object is viewable on a first group of contiguous facets and a second object is viewable on a second group of contiguous facets which is angularly spaced from said first group.

BRIEF DESCRIPTION OF THE DRAWINGS

Embodiments, features, and aspects of the invention are described herein in conjunction with the following drawings.

The drawings are not necessarily drawn to scale.

DETAILED DESCRIPTION OF THE INVENTION

The invention will be understood from the following detailed description of embodiments of the invention, which are meant to be descriptive and not limiting. For the sake of brevity, some well-known features, methods, systems, procedures, components, circuits, and so on, are not described in detail.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

Figure 1:
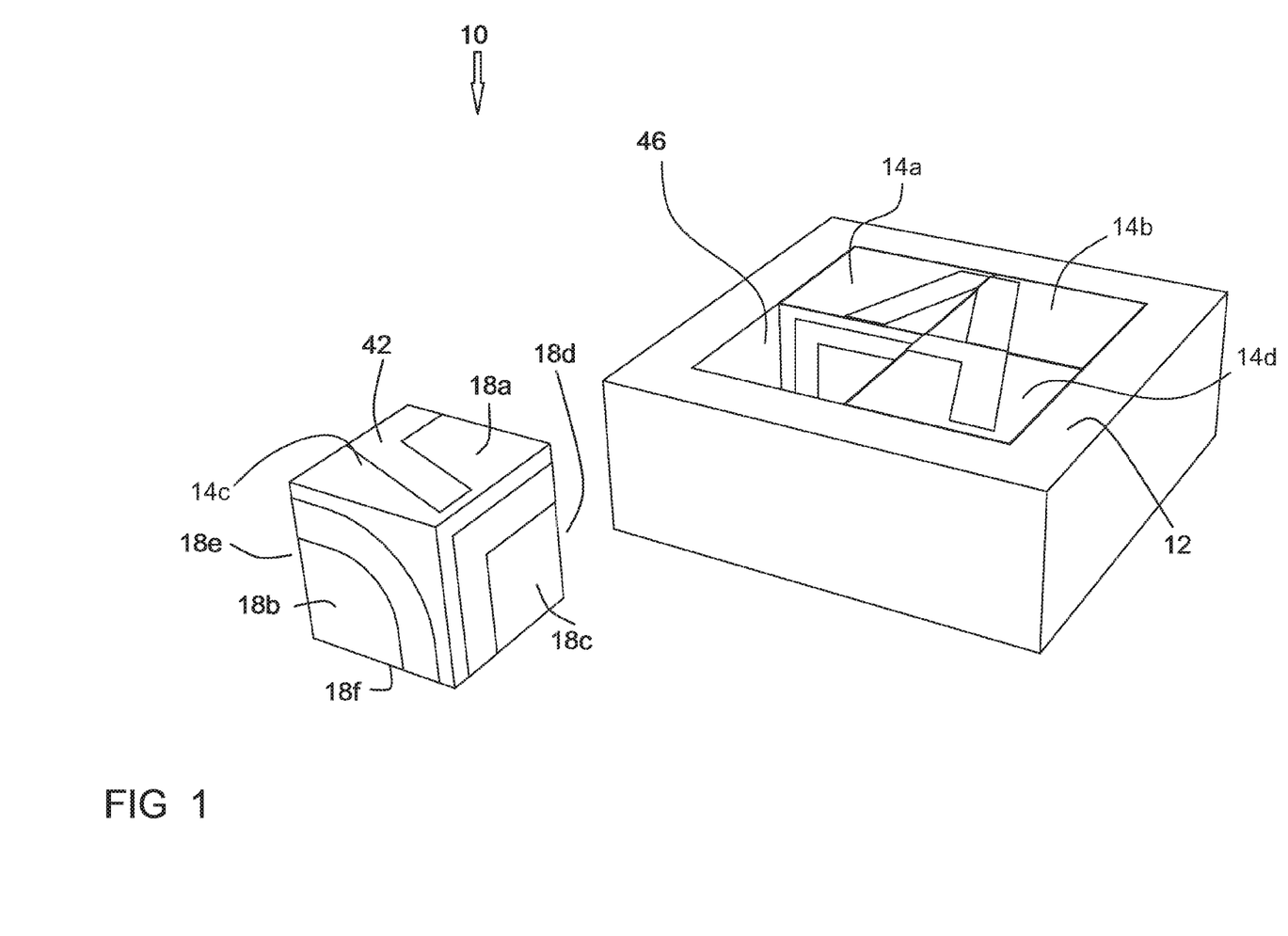
FIG. 1 depicts a puzzle set according to one embodiment of the invention.

FIG. 1 depicts a puzzle set according to one embodiment of the invention.

A puzzle set 10 includes a square frame 12, and four cubes 14a, 14b, 14c, and 14d, for being placed within square frame 12, as depicted by cubes 14a, 14b, and 14d, or removed therefrom, as depicted by cube 14c.

Each of the facets 18a, 18b, 18c and of the other facets of cubes 14a, 14b, 14c, and 14d includes a different drawing 42. As referred to herein, a "drawing" may be two or three dimensional, or a holograph, or of any other type, and may defined by one or more letters, indicia or symbols, or a combination thereof. The drawing on one facet, when made visible, is adapted to be positioned adjacently to another drawing of another facet of another cube, so that the adjacent drawings will complete one another to a known letter or symbol when positioned correctly.

Figure 2:
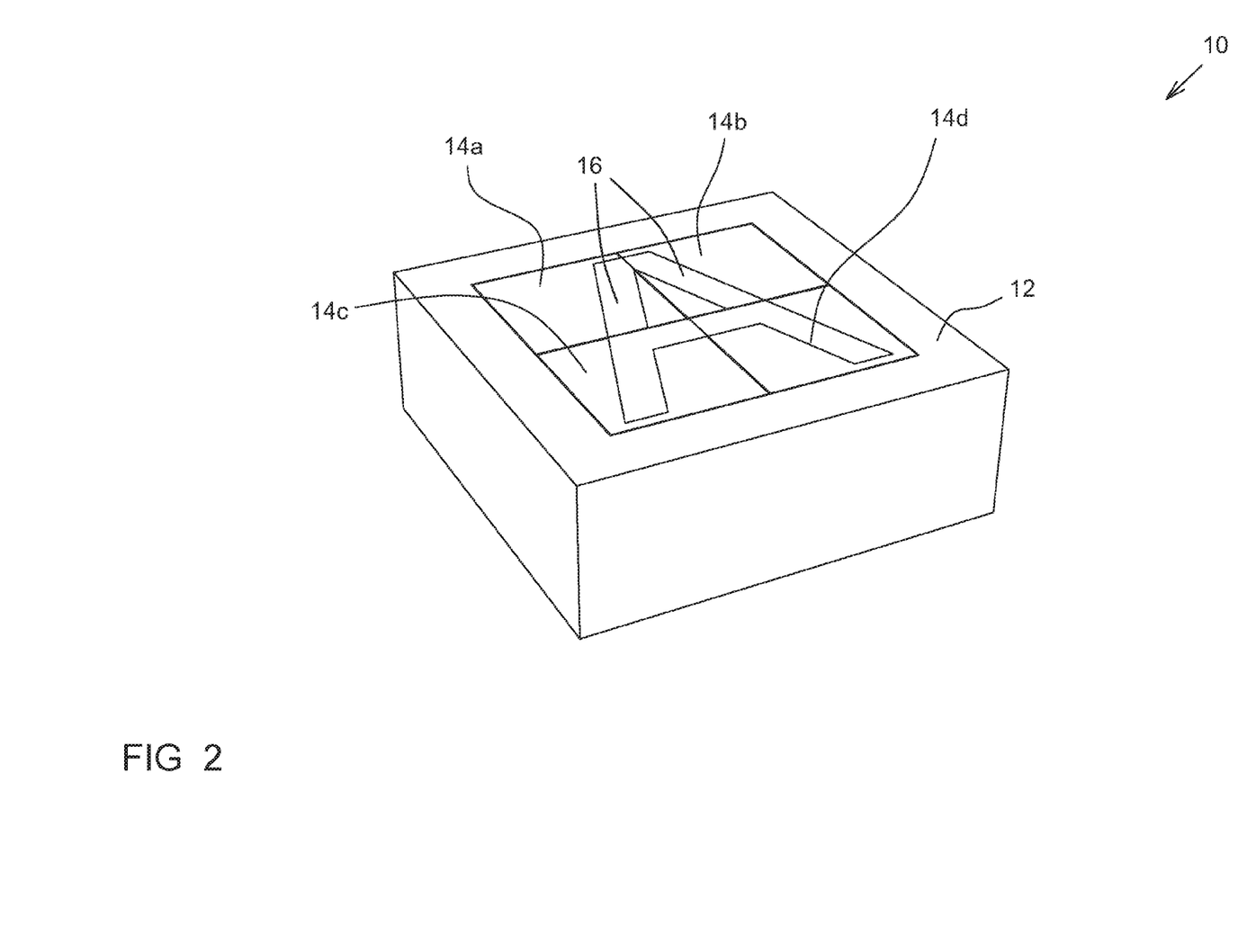
FIG. 2 depicts the puzzle set of FIG. 1, upon placing all of the cubes correctly.

FIG. 2 depicts the puzzle set of FIG. 1, upon placing all of the cubes correctly.

The challenge of the player is to place cubes 14a, 14b, 14c, and 14d within square frame 12, such as to complete a certain letter 16 or another logical symbol, such as depicted in FIG. 2.

Figure 3:
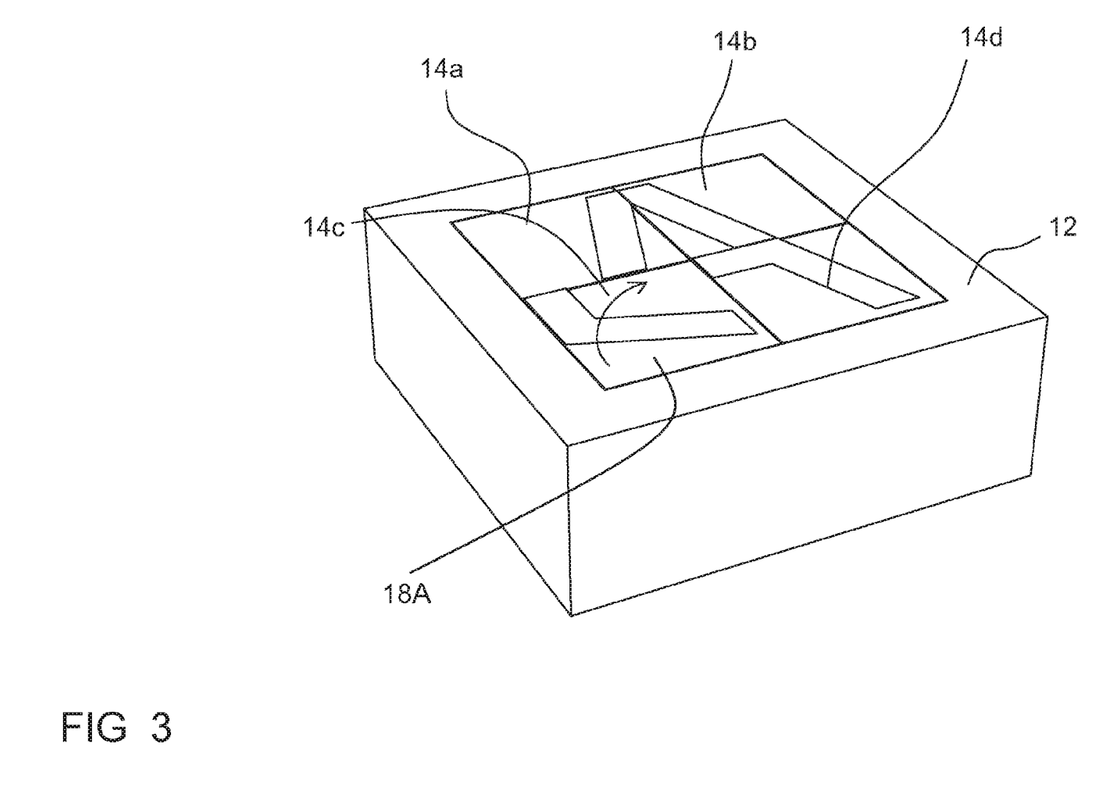
FIG. 3 depicts the puzzle set of FIG. 1, upon placing one of the cubes incorrectly.

FIG. 3 depicts the puzzle set of FIG. 1, upon placing one of the cubes incorrectly.

In FIG. 3, cube 14a is placed incorrectly. In this example facet 18a is the right facet. However, it must be rotated for being disposed correctly.

A first approach for correcting the placing is by removing cube 14c from square frame 12, and placing it back correctly to the position of FIG. 2. The removal may be applied either by lifting square frame 12, or by lifting cube 14c.

Figure 4:
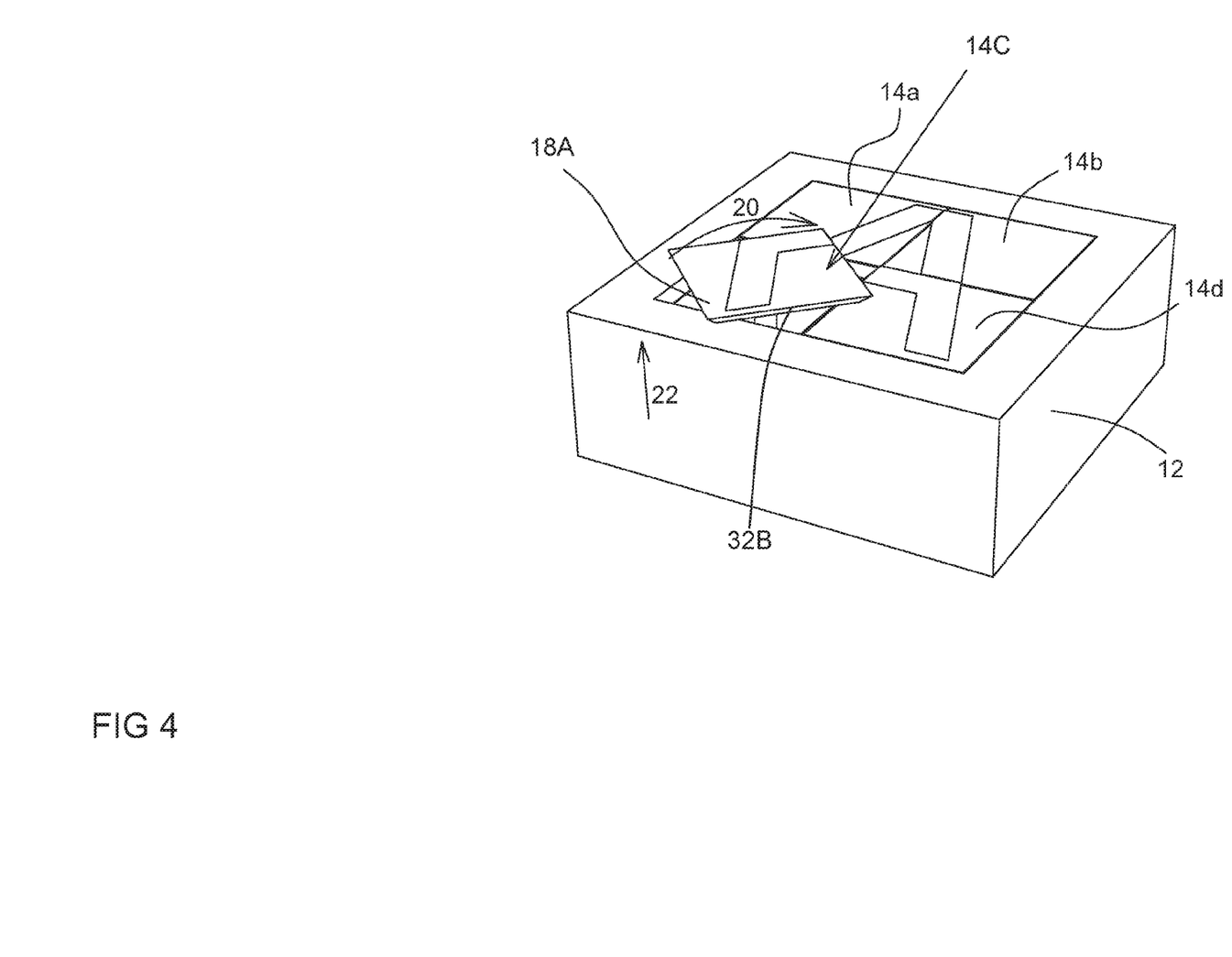
FIG. 4 depicts a second approach of correcting the disposition of the incorrect cube of FIG. 3.

FIG. 4 depicts a second approach of correcting the disposition of the incorrect cube of FIG. 3.

A second approach for correcting the disposition of a cube is carried out when the upper or visible facet of each of the cubes, e.g. cubes 14a-d, are initially coplanar, as urged by frame 12, shown to be rectilinear. Frame 12 also interfaces with, and urges, the plurality of cubes to be contiguous one with another. A selected cube, e.g. cube 14c, is then linearly displaced outwardly in the direction of arrow 22 by means of displacement facilitating apparatus, as will be described hereinafter, in relation to the visible facet of the other cubes 14a, 14b and 14d without separating cube 14c from the other cubes. Afterwards, facet 18a alone of cube 14c is rotated, as depicted by arrow 20, meaning that the user rotates facet 18a in relation to facets 18b and 18c of FIG. 1.

The user may insert the fingernail thereof into tilted end 32B, for elevating it and then for rotating it.

Although the puzzle set is shown to include four cubes, it will be appreciated that any other number of cubes may be provided, as long as they are initially coplanar and contiguous one with another.

Figure 5:
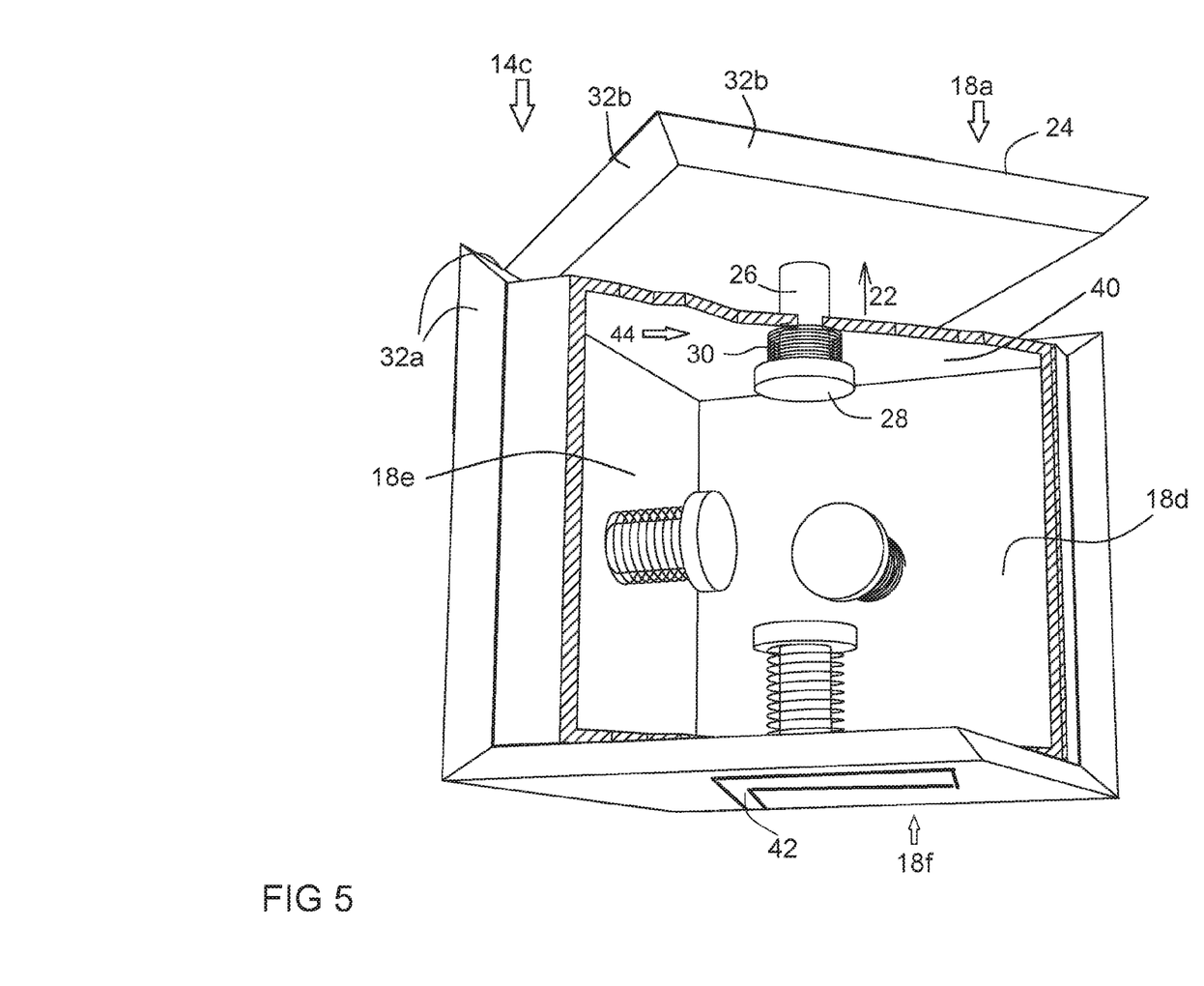
FIG. 5 is an internal cut view of the cube of FIG. 3.

FIG. 5 is an internal cut view of the cube, showing one embodiment of the displacement facilitating apparatus.

Each of facets 18a, 18d, 18e, 18f and the other facets includes a stationary surface 40; a movable surface 24 including the drawing 42; an axle 26, disposed at the center of stationary surface 40 and at the center of movable surface 24, for allowing rotating movable surface 24 about the axle; a removal preventer 28, for preventing removing movable surface 24 from stationary surface 40; and a positioning element 44, for positioning movable surface 24 at a stable position in relation to stationary surface 40.

Tilted ends 32a of stationary surfaces 40, being complementary to tilted ends 32b of movable surfaces 24, accompany positioning elements 44 in positioning movable surfaces 24 at stable positions in relation to stationary surfaces 40.

According to the embodiment of FIG. 5, positioning element 44 constitutes a spring 30. The displacement facilitating apparatus therefore comprises axle 26 disposed at the center of stationary surface 40 and at the center of movable surface 24, removal preventer 28, and spring 30. Upon inserting a fingernail thereof into tilted end 32B, movable surface 24, when pulled against spring 30, is able to be linearly displaced outwardly relative to stationary surface 40 without being removed from the cube. At this outward linearly displaced position, movable surface 24 is free to be subsequently rotated while axle 26 constitutes rotation facilitating apparatus.

Figure 6:
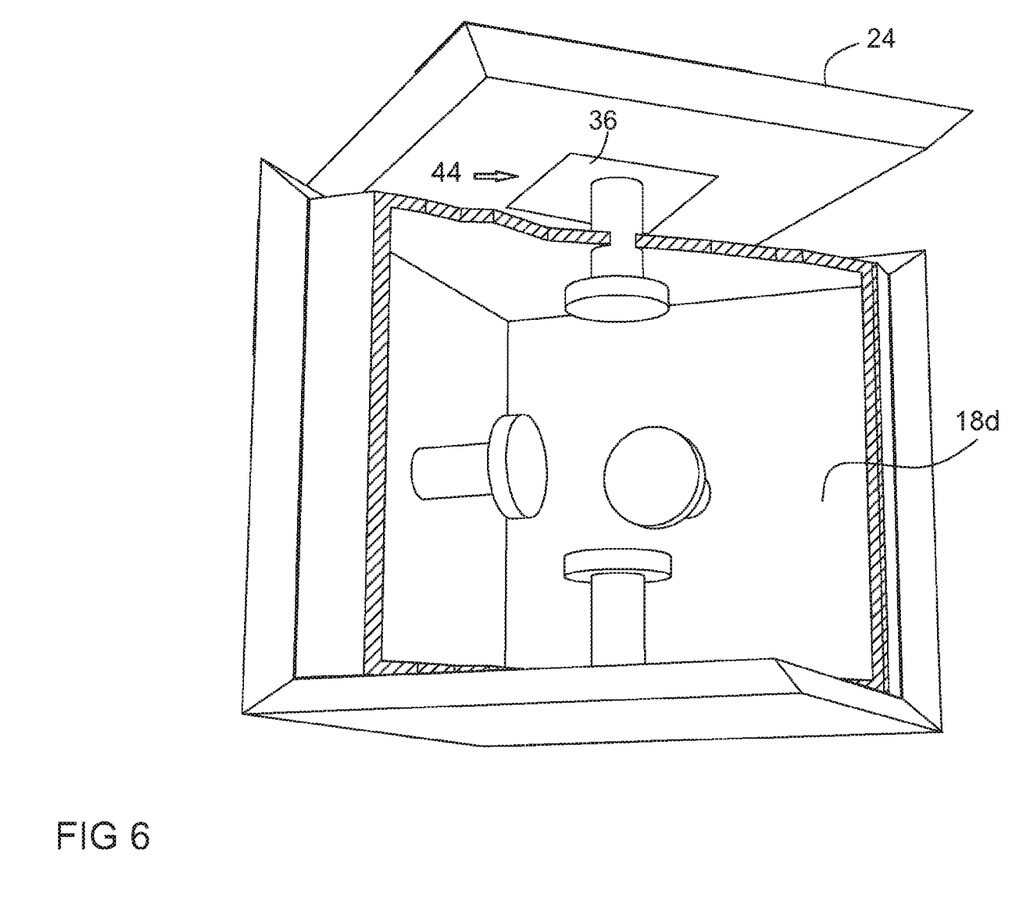
FIG. 6 is an internal cut view of the cube of FIG. 3 according to another embodiment.

FIG. 6 is an internal cut view of the cube according to another embodiment.

According to the embodiment of FIG. 6, positioning element 44 constitutes a magnet 36.

Figure 7:
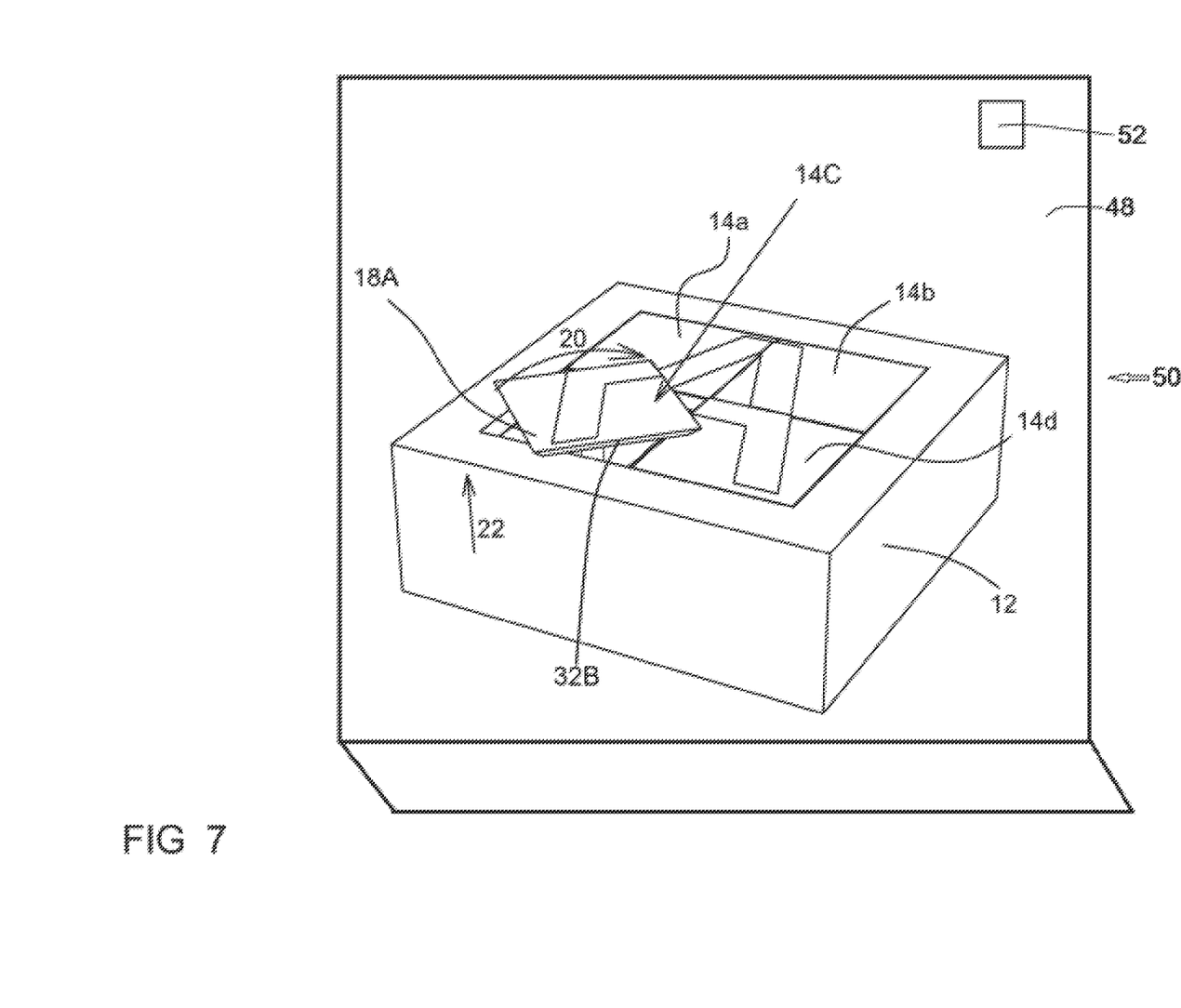
FIG. 7 depicts the puzzle set according to another embodiment.

FIG. 7 depicts the puzzle set according to another embodiment.

According to another embodiment, puzzle set 10 may be an electronic game resembling the physical game described in FIGS. 1 to 6, such that all of the elements of FIG. 6 are applied by programmed elements, run by a program or computer application 52, as displayed by a screen 48 of a computer 50 or of a phone. Computer application 52 may be run on the processor of a computer or a smartphone.

Thus the puzzle set (10) includes:
four cubes (14a, 14b, 14c, 14d), each including a drawing (42) at each of facets (18a, 18B) thereof,
a square frame (12), for placing the four cubes (14a, 14b, 14c, 14d) adjacent one to the other within the square frame (12), and for allowing removing any of the four cubes (14a, 14b, 14c, 14d) therefrom, for changing disposition and rotational state thereof, wherein the square frame (12) includes at least a top opening (46), for viewing a top facet (18a) of each of the four cubes (14a, 14b, 14c, 14d), and wherein the drawings (42) are designed to allow continuation of one another, for allowing a player to make the viewed top facets of the four cubes (14a, 14b, 14c, 14d) provide together various letters, indicia or symbols (16), upon positioning the four cubes (14a, 14b, 14c, 14d) within the square frame (12) correctly, and wherein at least one of the facets (18a) of the at least one of the four cubes (14a, 14b, 14c, 14d) is rotatable in relation to the other facets (18a) of that cube, thereby allowing rotating the drawing thereof without removing the cube.

The at least one of the facets (18a) of the at least one of the four cubes (14a, 14b, 14c, 14d) including the rotatability in relation to the other facets (18a) of that cube, may include:
a stationary surface (40); and
a movable surface (24), for moving in relation to the stationary surface (40).

The at least one of the facets (18a) may further include:
an axle (26), for moving the movable surface (24) thereabout.

The at least one of the facets (18a) may further include:
a positioning element (44), for positioning the movable surface (24) at a stable position in relation to the stationary surface (40).

The positioning element (44) may constitute a spring (30), or a magnet (36) or another element. The player is able to pull the movable surface from the stable position thereof, against the spring or magnet, for allowing rotating thereof;

The at least one of the facets (18a) may further include:
tilted ends (32A, 32B) of the stationary surface (40) and of the movable surface (24), being complementary one to the other.

The at least one of the facets (18a) may further include:
an element (28), such as a limiting wide element, for preventing removal of the movable surface (24) from the stationary surface (40).

The four cubes (14a, 14b, 14c, 14d) and as well the other elements of the puzzle set (10) may be electronic, for being displayed by a screen (48), and for being played via a user interface.

Figure 8:
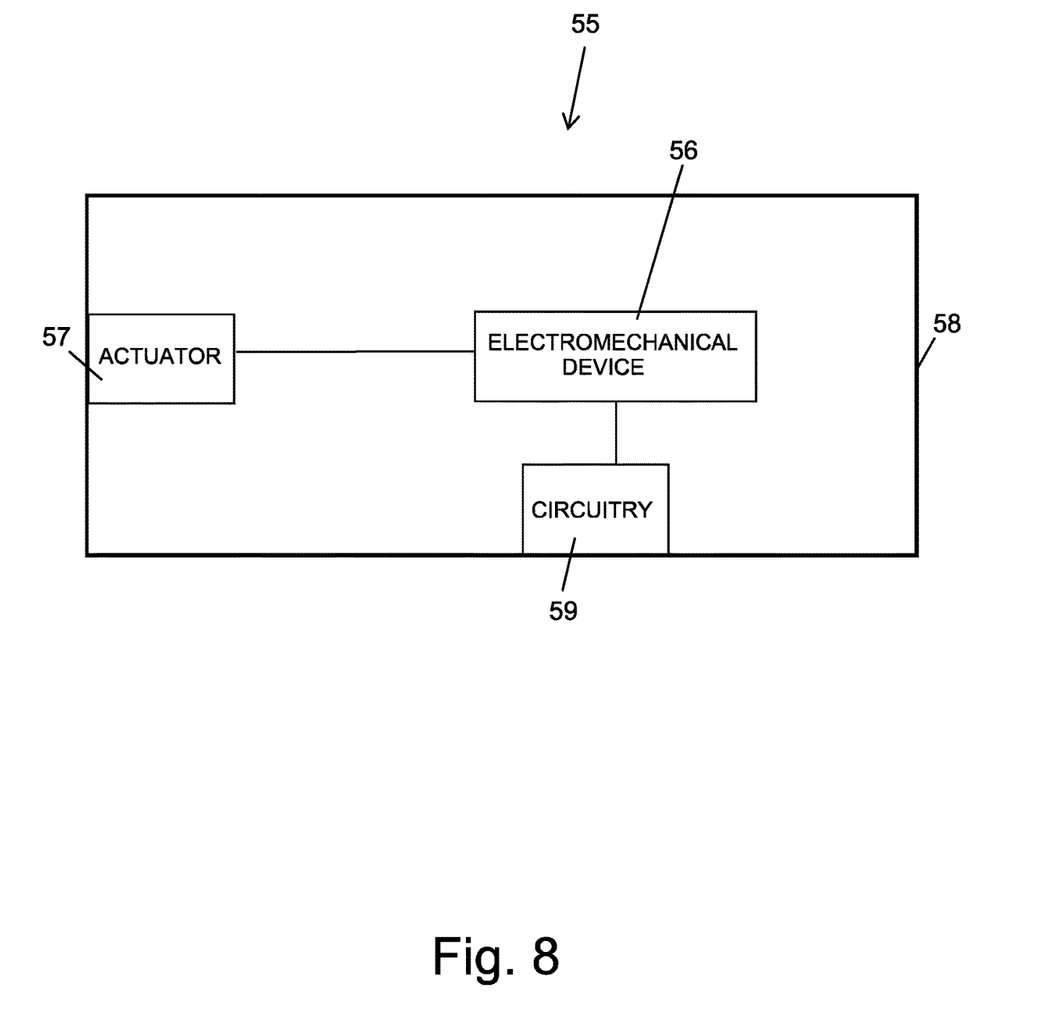
FIG. 8 is a schematic illustration of displacement facilitating apparatus according to another embodiment.

As schematically illustrated in FIG. 8, displacement facilitating apparatus 55 may comprise one or more electromechanical devices 56 operatively connected to a facet and an actuator 57 for effecting the displacement. The actuator 57 may be mounted on an interface 58 which comprises circuitry 59 that causes a plurality of cubes to be positioned one adjacent to the other, so that the displacement facilitating apparatus 55 of two or more cubes will be simultaneously and selectively effected. Upon operation of a first electromechanical device by its actuator, which constitute displacement facilitating apparatus, the facet is linearly displaced outwardly relative the facet of each adjacent cube. Upon operation of a second electromechanical device by its actuator, which constitute rotation facilitating apparatus, the facet at this outward linearly displaced position is rotated. Circuitry 59 may comprise one or more LED lamps for effecting a desired visual presentation or a sound enunciator for generating desired sound information. Circuitry 59 may also comprise a controller for controlling operation of LED lamps or the sound enunciator in response to an actuated action performed by actuator 57.

Figure 9:
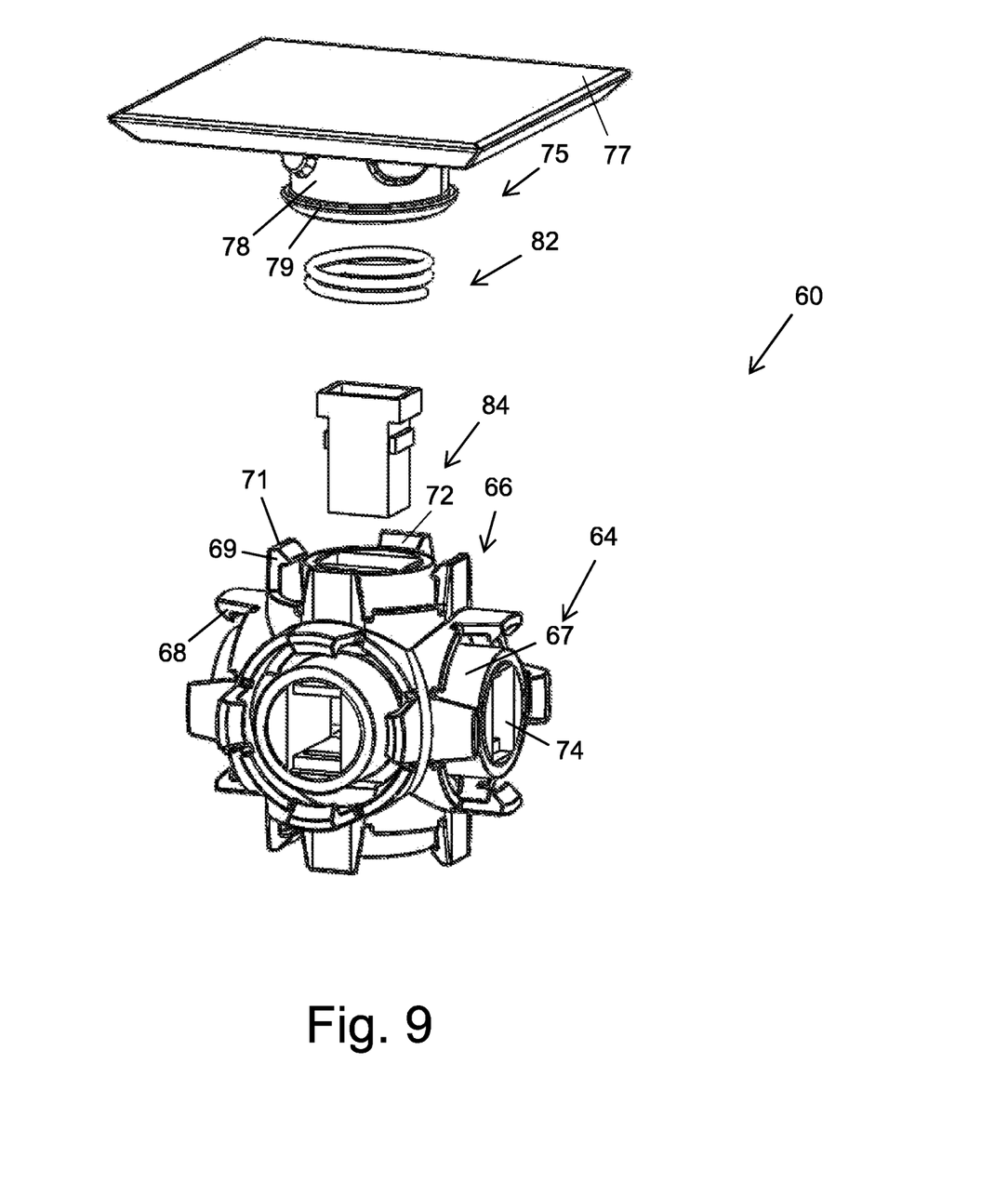
FIG. 9 is a perspective exploded view of a cube according to another embodiment, showing the displacement facilitating apparatus associated with one facet of the cube.
Figure 10:
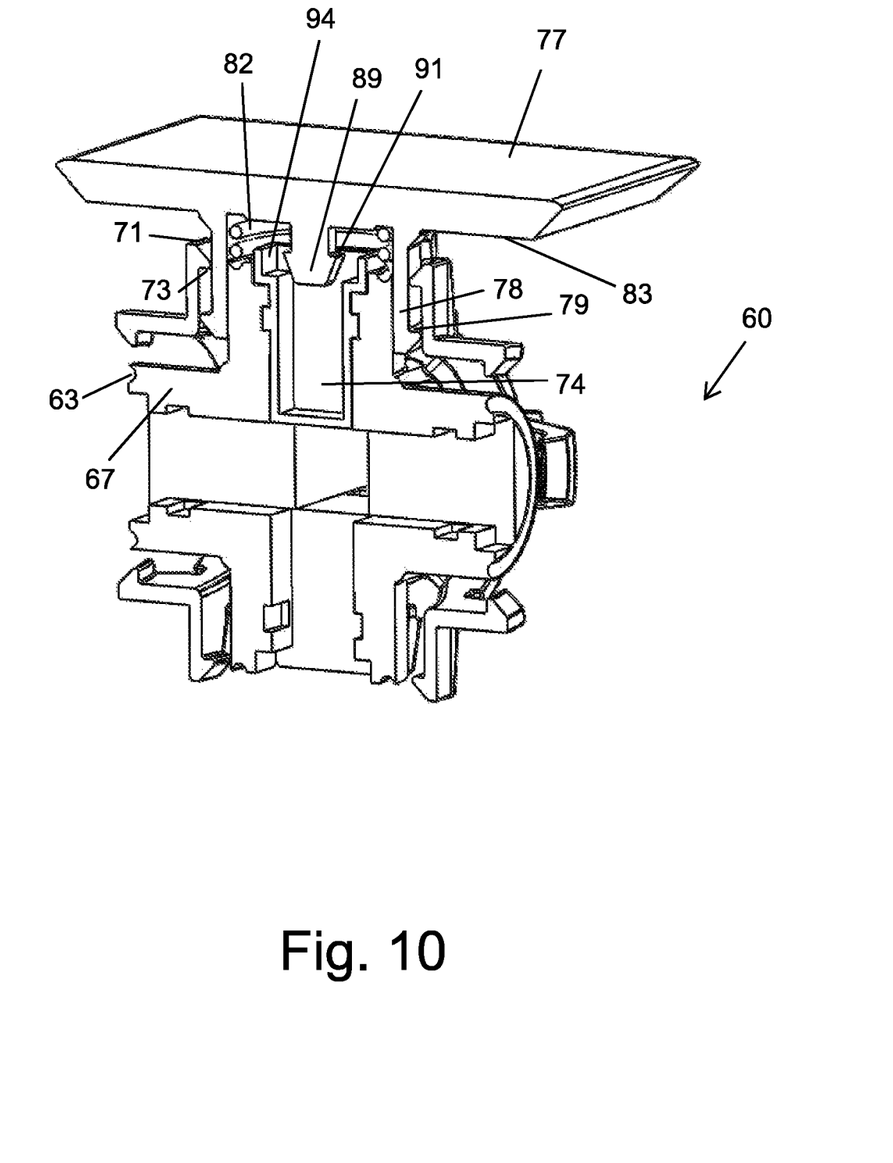
FIG. 10 is a perspective, longitudinal cross sectional view of the cube of FIG. 9 through four latch mechanism insertable apertures.
Figure 11:
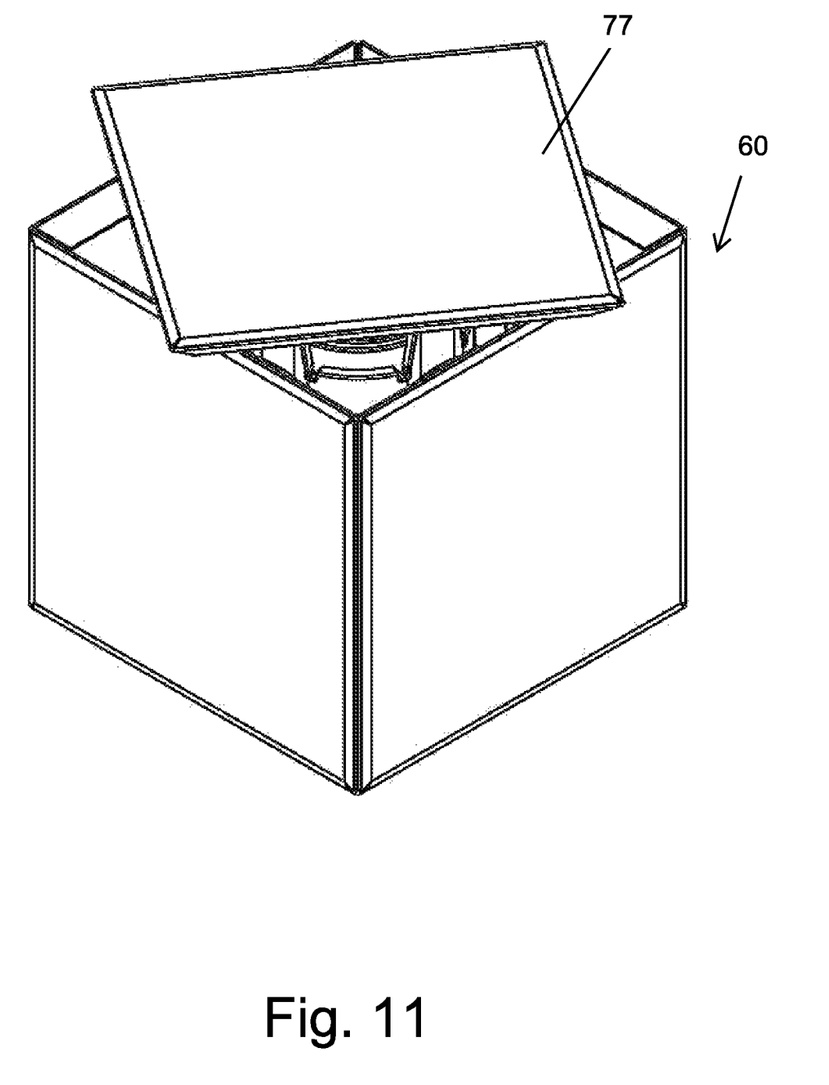
FIG. 11 is a perspective view of the cube of FIG. 9 when assembled, one facet thereof shown in an extended and rotated position.

FIGS. 9-11 illustrate another embodiment of a cube 60 of another puzzle set, which is configured with a reduced number of parts.

In this embodiment, as shown in FIG. 9, cube 60 comprises a core member 64 for supporting the displacement facilitating apparatus for each of six facets of the cube, which is urged by an interface member to be positioned contiguously to another cube such that a visible facet of each of the contiguous cubes is coplanar. Core member 64 comprises six identical support units 66 for movably supporting a corresponding facet unit 75.

Support unit 66 comprises a tubular projection 67 and a plurality of circumferentially spaced hooked elements 68, e.g. four, which are radially spaced outwardly from projection 67. The outer wall 69 of a hooked element 68, which may be flexible and substantially perpendicular to the outer wall of a hooked element of an adjacent support unit, has an unattached end which terminates with a thin surface 71 that is substantially perpendicular to outer wall 69. An inclined surface 72 extends from terminal surface 71 towards tubular projection 67, and has an undersurface 73 substantially parallel to terminal surface 71. Tubular projection 67 is formed with an aperture 74, e.g. rectangular, whose one or more walls are substantially parallel to the longitudinal axis of tubular projection 67.

Facet unit 75 has a rectangular and planar facet 77, e.g. square, which is applied with a drawing. A hollow and annular extension 78 extends from the underside 83 of facet 77, and terminates with a lip 79 that radially protrudes outwardly and axially, i.e. in a direction parallel to the longitudinal axis of tubular projection 67 when facet unit 75 is coupled thereto, from the terminal end of extension 78.

The annular extension 78 is adapted to be fitted in the interspace between tubular projection 67 and the plurality of hooked elements 68, momentarily causing their outer wall 69 to flex upon contacting each inclined surface 72. Facet unit 75 is configured to rotate about the longitudinal axis of tubular projection 67 while lip 79 may contact an inner face of the hooked elements 68. Both core member 64 and facet unit 75, or only a portion of each, may be made of a plastic material or a low friction polymer to reduce friction during rotation. Undersurface 73 of a hooked element 68, which is contactable by protruding lip 79 of facet unit 75, serves to limit the linear stroke of facet unit 75.

Coiled spring 82, e.g. a compression spring, serves to linearly displace facet unit 75, and is configured to normally cause displacement of facet unit 75 away from tubular projection 67. Coiled spring 82 is housed within the interior of extension 78, and may be seated in an annular recess 63 formed at the terminal end of tubular projection 67.

Spring loaded latch mechanism 84, which may have a rectilinear configuration, serves to counteract the bias of coiled spring 82 by pulling facet unit 75 towards tubular projection 67. Latch mechanism 84 is coupled to support unit 66, for example by a snap fit, upon insertion within aperture 74, and may be releasably engageable with a discontinuous region 91, for example at the end of an inclined surface, of a restraint element 89 interconnected with the underside 83 of facet 77. Restraint element 89 is coincident with a central region of facet 77, and also with aperture 74 when facet unit 75 is coupled with support unit 66.

Latch mechanism 84 may be a push latch mechanism, for example the 41033 latch mechanism manufactured by GBK UK Limited, Lancashire, UK, which comprises two lever arms and a head element extending away from each lever arm. The two lever arms are configured to be automatically pivotally displaced upon insertion within aperture 74 to a fullest extent, in such a way that the head elements engage discontinuous region 91 of restraint element 89, to thereby retain facet 77 in a retracted position such that it is unable to be rotated while in contiguous relation with one or more coplanar facets of other cubes.

When facet 77 is in the retracted position, as illustrated in FIG. 10, underside 83 of facet 77 is in pressing relation with coiled spring 82, which may be seated within recess 63.

It will be appreciated that other latch mechanisms well known to those skilled in the art may also be employed.

When facet 77 is pressed, the applied force is transmitted to restraint element 89, which in turn is linearly displaced inwardly within the interior of aperture 74. Consequently, the head elements are released from discontinuous region 91 and are pivotally displaced within the widened region 94 of aperture 74. Since coiled spring 82 ceases to be pressed by the facet underside 83, the potential energy of coiled spring 82 is released, applying a force to facet underside 83 and causing facet 77 to be linearly spaced to an extended position, such that the facet is linearly spaced from the other coplanar facets. Since facet 77 is unrestricted, facet unit 75 is free to rotate about the longitudinal axis of tubular projection 67, as shown in FIG. 11, until a drawing applied to facet 77 is located in a desired orientation.

Cube 60 is assembled when a facet unit 75 is coupled with each corresponding support unit 66. In this embodiment, the displacement facilitating apparatus comprises annular and hollow extension 78 extending from facet 77, a coiled spring 82 housed within hollow extension 78 for facilitating the outward linear displacement of facet 77, and a latch mechanism 84 which is inserted within an aperture 74 of support unit 66 in order to be coupled thereto and is releasably engageable with restraint element 89 connected to facet 77 for preventing the outward linear displacement when facet 77 is in a retracted position. Facet 77, after being pressed, is linearly displaced outwardly by coiled spring 82 following release of latch mechanism 84 from restraint element 89 and is free to rotate about the longitudinal axis of tubular projection 67 of core member 64. Tubular projection 67 and annular extension 78, which is rotatable about tubular projection 67, constitute the rotation facilitating apparatus.

Many more possibilities to define a composite symbol or symbols together with facets of other cubes are provided when cube 60 is removed from the interface member and reoriented.

The foregoing description and illustrations of the embodiments of the invention have been presented for the purpose of illustration. It is not intended to be exhaustive or to limit the invention to the above description in any form.

Any term that has been defined above and used in the claims, should be interpreted according to this definition.

The invention claimed is:

1. A puzzle set, comprising:
   a plurality of cubes, each comprising a drawing at one or more facets thereof; and
   an interface configured to cause said plurality of cubes to be positioned one adjacent to the other and to cause a first facet of each of said plurality of cubes viewed by a player to be coplanar, while permitting a change in disposition and rotational state of the first facet of any of said plurality of cubes;
   wherein said drawing at one or more facets of a first of said plurality of cubes is designed to allow continuation of another drawing at one or more facets of a second of said plurality of cubes, by which contiguous facets of said plurality of cubes including said first and second cubes that are viewed by the player define together a composite symbol or symbols, upon positioning said plurality of cubes in accordance with a predetermined arrangement; and
   wherein at least one of said one or more facets of each of said plurality of cubes comprises displacement facilitating apparatus to facilitate outward linear displacement and subsequent rotation of a selected first facet in relation to all other first facets of said plurality of cubes when the first facet of each of said plurality of cubes are positioned one adjacent to another and are coplanar and contiguous one with another, thereby allowing rotation of the drawing of said selected first facet to achieve said predetermined arrangement.

2. The puzzle set according to claim 1, wherein the displacement facilitating apparatus comprises:
   a stationary surface; and
   a movable surface which is movable in relation to said stationary surface.

3. The puzzle set according to claim 1, wherein at least one of said facets of each of said plurality of cubes comprises the displacement facilitating apparatus.

4. The puzzle set according to claim 3, wherein all facets of each of said plurality of cubes comprise the displacement facilitating apparatus.

5. The puzzle set according to claim 1, wherein the displacement facilitating apparatus further comprises rotation facilitating apparatus to facilitate rotation in relation to the other facets of said plurality of cubes.

6. The puzzle set according to claim 5, wherein the rotation facilitating apparatus comprises an axle, for moving a movable surface of the displacement facilitating apparatus about a stationary surface of the displacement facilitating apparatus.

7. The puzzle set according to claim 2, wherein the displacement facilitating apparatus further comprises: a positioning element, for positioning said movable surface at a stable position in relation to said stationary surface.

8. The puzzle set according to claim 7, wherein said positioning element comprises a member selected from a group consisting of a spring and a magnet.

9. The puzzle set according to claim 2, wherein said at least one of said facets further comprises: oblique surfaces of said stationary surface and of said movable surface, being complementary one to the other.

10. The puzzle set according to claim 2, wherein said at least one of said facets further comprises:
an element for preventing removal of said movable surface from said stationary surface.

11. The puzzle set according to claim 1, wherein the interface is a frame configured to urge the plurality of cubes in a formation of rows and columns, when placed adjacent one to the other within the frame.

12. The puzzle set according to claim 1, wherein the interface is embodied by magnetic material which is provided with one or more facets of each of said plurality of cubes, for magnetically coupling together adjacent cubes.

13. The puzzle set according to claim 1, wherein the displacement facilitating apparatus is configured to facilitate concurrent linear displacement and rotation in relation to the other facets of said plurality of cubes.

14. The puzzle set according to claim 1, wherein the displacement facilitating apparatus is configured to facilitate outward linear displacement of the selected first facet in a direction substantially parallel to the other first facets of the plurality of cubes which are positioned one adjacent to the other and are coplanar and contiguous one with another.

15. The puzzle set according to claim 4, wherein the interface is also configured to cause a second facet of each of said plurality of cubes viewed by a player to be coplanar, and wherein at least one of said second facets comprises the displacement facilitating apparatus to facilitate outward linear displacement and subsequent rotation of a selected one of said second facets in relation to the other second facets of said plurality of cubes when the other second facets of said plurality of cubes are positioned one adjacent to the other and are coplanar and contiguous one with another, thereby allowing rotation of the drawing of said selected second facet without separating one of said plurality of cubes from other ones of said plurality of cubes.

16. The puzzle set according to claim 3, wherein the displacement facilitating apparatus further comprises one or more electromechanical devices and an actuator for effecting the displacement.

17. The puzzle set according to claim 16, wherein the actuator is mounted on the interface, the interface comprising circuitry causing said plurality of cubes to be positioned one adjacent to the other and the displacement facilitating apparatus of two or more of said plurality of cubes to be simultaneously and selectively effected.

18. The puzzle set according to claim 1, wherein the interface is a user interface and said plurality of cubes are graphically displayable on a screen of an electronic device, said user interface configured to cause rotation of one or more cubes of said plurality of cubes in response to selective manipulation of said user interface and predetermined instructions stored in a processor on which said user interface is running to define the composite symbol or symbols in accordance with the predetermined arrangement.

19. The puzzle set according to claim 1, wherein the displacement facilitating apparatus comprises a hollow element extending from the selected first facet which is rotatable about a tubular projection of a core member, a coiled spring housed within said hollow element for facilitating the outward linear displacement, and a latch mechanism releasably engageable with an element connected to the selected first facet for preventing the outward linear displacement when the selected first facet is in a retracted position.

20. A method for generating a viewable object, comprising the steps of:
providing a plurality of cubes, each comprising a drawing at one or more facets thereof;
causing said plurality of cubes to be positioned one adjacent to another while a first facet of each of said plurality of cubes viewed by a player are coplanar and contiguous one with another and the drawing at one or more facets thereof on each of said first facets are non-continuous;
linearly displacing at least one selected facet of said first facets of said plurality of cubes outwardly in relation to all other first facets of said plurality of cubes when the first facet of each of said plurality of cubes are positioned one adjacent to the other and are coplanar and contiguous one with another; and
rotating said at least one linearly displaced selected facet until the drawing at one or more facets thereof on each of said first facets, when once again coplanar, are in continuation of one another to define together a viewable object.

* * * * *